United States Patent [19]

van Kuijk

[11] 4,311,132

[45] Jan. 19, 1982

[54] SOLAR HEAT COLLECTOR

[75] Inventor: Josephus P. M. van Kuijk, Blonay, Switzerland

[73] Assignee: Patlico Rights N.V., Curacao, Netherlands Antilles

[21] Appl. No.: 65,852

[22] Filed: Aug. 13, 1979

[30] Foreign Application Priority Data

Aug. 21, 1978 [NL] Netherlands .................. 7808623

[51] Int. Cl.³ .............................................. F24J 3/02
[52] U.S. Cl. .................................. 126/438; 126/443; 126/451
[58] Field of Search ............... 126/451, 438, 442, 443, 126/449, 448; 165/172, 177

[56] References Cited

U.S. PATENT DOCUMENTS

| | | | |
|---|---|---|---|
| 3,321,012 | 5/1967 | Hervey | 126/438 |
| 3,990,430 | 11/1976 | Robertson | 126/438 |
| 4,024,852 | 5/1977 | L'Esperance et al. | 126/438 |
| 4,038,964 | 8/1977 | Drew | 126/443 |
| 4,048,983 | 9/1977 | Pei | 126/438 |
| 4,098,264 | 7/1978 | Brokaw | 126/438 |
| 4,119,085 | 10/1978 | Knowles et al. | 126/438 |
| 4,122,831 | 10/1978 | Mahdjuri | 126/443 |
| 4,166,446 | 9/1979 | Young | 126/438 |
| 4,175,540 | 11/1979 | Roantree | 126/438 |
| 4,196,716 | 4/1980 | Evans | 126/442 |

FOREIGN PATENT DOCUMENTS

| | | | |
|---|---|---|---|
| 2505522 | 9/1975 | Fed. Rep. of Germany | 126/438 |
| 2556725 | 6/1977 | Fed. Rep. of Germany | 126/438 |

*Primary Examiner*—Daniel J. O'Connor
*Attorney, Agent, or Firm*—O'Brien & Marks

[57] ABSTRACT

A solar heat collector provided with an elongate circumferential wall of generally semi-circular shape in cross section, which wall at the concave side comprises a reflective surface of, likewise in cross section, at least substantially semi-circular shape, with heat collection provisions within the space defined by the circumferential wall and two collector end walls disposed at the collector ends, as well as with a solar radiation-transmissive cover before the collection opening formed between the free longitudinal edges of the reflective surface, which heat collection provisions extend within a flat portion of the space within the semi-circular portion of the reflective surface, in the direction transversely to the median plane of the reflective surface, vertically in the North-South direction, over substantially the entire median plane, insofar disposed within the said portion of said space.

5 Claims, 7 Drawing Figures

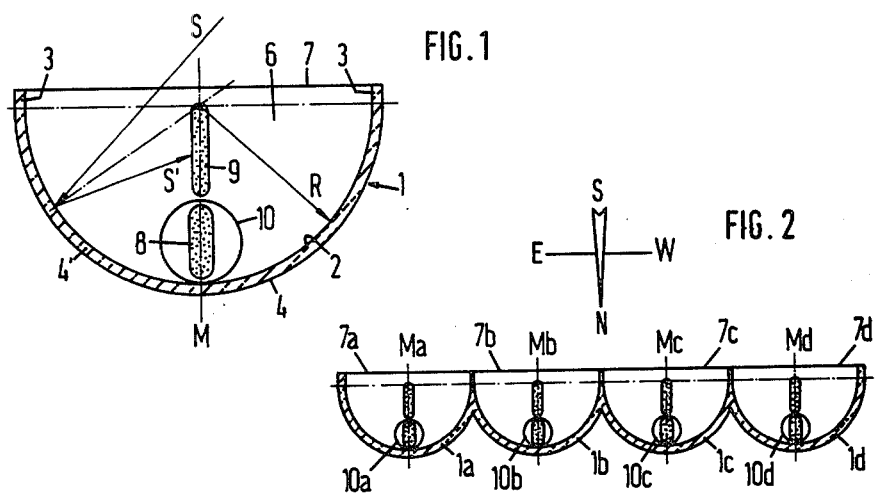
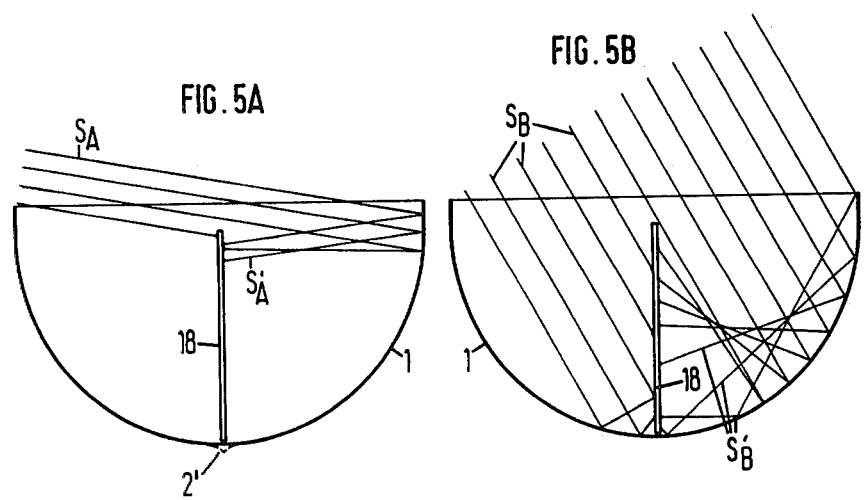
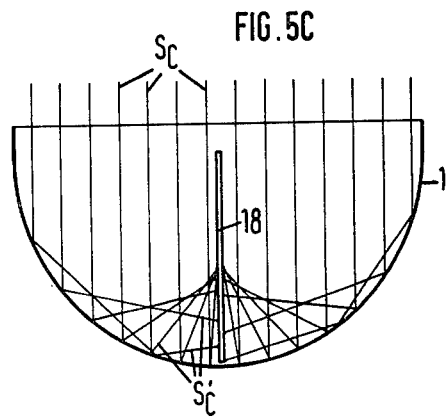

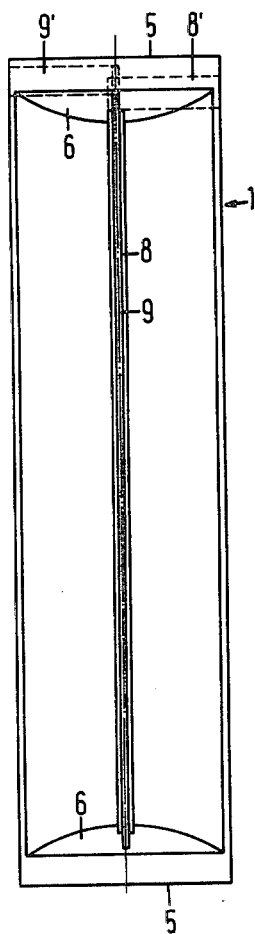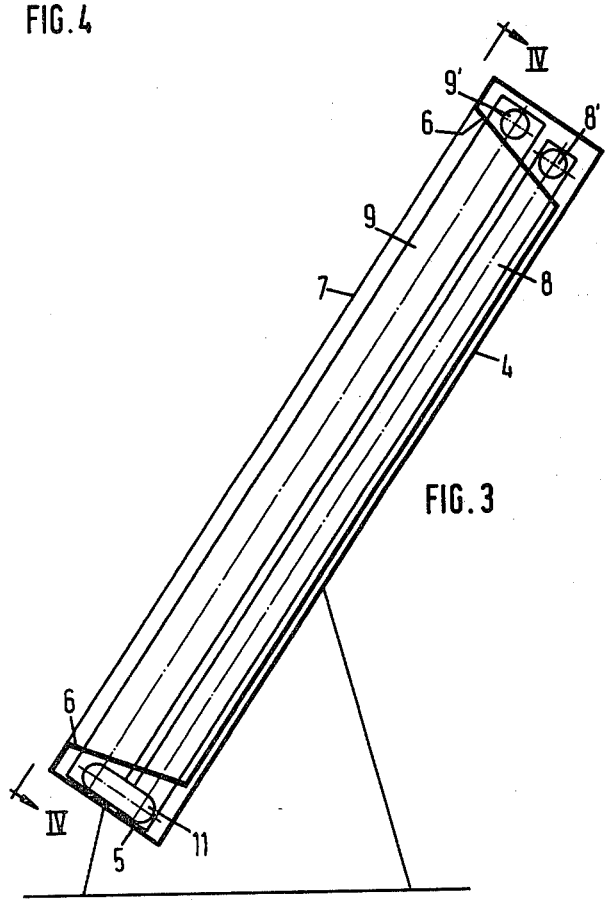

SOLAR HEAT COLLECTOR

The invention relates to a solar heat collector, provided with an elongate circumferential wall of generally semi-circular shape in cross section, which wall consists at the concave side of a reflective surface, with heat collection provisions within the space defined by said surface between two end walls of said collector disposed at the collector ends, as well as with a cover transmitting solar radiation to said reflective surface before the collection opening formed between the free longitudinal edges of the reflective surface.

Such collectors are known in various designs. The heat collection provisions comprise substantially always a liquid containing tube or tube system to be heated by solar radiation, in the centre of the space defined by the reflective surface. The reflective surface is mostly of parabolic cross section. In many cases such collectors, with their longitudinal axes parallel to a vertical, North-South oriented plane, are arranged movably, pivoting along with the position of the sun, with a view to an optimal incidence of solar radiation.

It is the object of the invention to provide a simple and hence rationally manufacturable solar heat collector of the above described type which has no movable parts, and adapted for stationary arrangement, i.e. without operating and drive mechanism and, partly due to its stationary arrangement, which does practically not require supervision or maintenance but nevertheless having a comparatively very favourable thermal efficiency.

To this end such a solar heat collector according to the invention is further characterized in that the reflective surface, insofar round, is semi-circular in cross section and the heat collection provisions within a flat portion of the space defined by the semi-circular portion of the reflective surface, in the direction transversely to the median plane of the reflective surface vertically in the North-South direction, extend over substantially the entire median plane of said reflective surface, insofar disposed within the said portion of said space. The said space within the semi-circular part of the reflective surface is thus subdivided by the flat heat collection provisions in the median plane into two identical halves.

The directions according to which the incident or "captured" sunrays impinge on the reflective surface can never enclose an angle having the value zero to the perpendicular on said surface at the place of incidence, so that no captured rays can be reverberated outwardly. Moreover, those collected sun rays that do not directly impinge on the heat collection provisions reach said provisions already after one reverberation, which enhances the effective heating.

By means of the invented collector the sun rays are collected over a direction range extending substantially through 180° from East to West, i.e. in spite of the stationary arrangement of the collector, effective collection is ensured from very early in the morning till very late in the afternoon. Moreover, during the early morning hours and the late afternoon hours, a substantial portion of the collected sun rays directly impinges on the heat collection provisions and at an angle that is favourable for the contemplated heating.

In order to have the heat collection provisions arranged according to the median plane optimally cover the entire length of the radius oriented according to the median plane of the above mentioned semi-circular shape, said reflective surface, in cross section, may be slightly extended at its two longitudinal edges. Then the semi-circle is thus, on either end, slightly prolonged either by a straight or by an arcuate extension. The cover disposed on the opening or mouth of the reflector may then pass freely in front of the outer boundary of the heat collection provisions.

The size of the collection provisions measured from the collector mouth as far as the reflective surface is thus approximately half the width of the collection opening measured between the free longitudinal edges of the reflective surface.

The heat collection provisions arranged according to the invention in the median plane avoid also substantially that rays from the one half disposed at the one side of said collection provisions for reverberated towards the other half of the reflective surface.

The invented collector is arranged stationary with the median plane vertical and in the North-South direction. The collector is positioned with its longitudinal axis in its optimally inclined or possibly horizontal position, with a view to its location on earth.

As a result of the North-South direction of the median plane, a particularly intensive solar radiation concentration is obtained on the portion of the heat collection provisions lying deepest in the collector space. This is highly favourable, since thus an extra high temperature level in said portion of the provisions can be achieved.

The invented collector lends itself particular well to incorporation in, respectively on roofs of all kinds of inclinations, as well as upright walls etc. Always all sun rays collected via the collection opening arrive directly or after reverberation on the heat collection provisions.

Particular mention therefore should be made of the fact that also the solar radiation incident as diffuse light heats the planar heat collection provisions with increased efficiency, since the solar radiation incident along a width of about twice the radius of the reflective surface is concentrated by reflection on the heat collection provisions having only half this width.

According to the invention when—as known per se—use is made for the heat collection provisions of such collectors, of liquid containing tubes, said collector tubes may be formed by a plurality of tubes closely spaced apart in the direction of the median plane. The direction of said tubes is then preferably parallel to the longitudinal axis of the collector but may also include an angle therewith or be transverse thereto.

According to the invention, upon application of such tubes, furthermore one of the liquid tubes forming part of the heat collection provisions may have a planar or oval cross-sectional shape in the direction transversely to the median plane of the reflective surface.

A highly favourable embodiment according to the invention, upon application of the liquid tubes, consists in that the heat collection provisions are formed by two tubes thermally insulated from each other, of oval or planar tube section, the longitudinal axis of said two cross sections lying in the median plane of the reflective surface.

The planar tube deepest installed in the concave collector cavity, e.g. on account of the comparatively high liquid temperatures that may be obtained especially during the hours of the day having the most intensive radiation—in particular around noon—is then used for heating boiler water, or for other purposes for which the higher temperature is required, while the outer tube is used for a lower temperature. It is possible therefore to heat two liquid systems at varying high temperatures. If desired, it is also possible, through a corresponding switching operation, to utilize the outer tube as preheating stage for further heating in the deepest installed tube. The dimension of the cross section of the two tubes measured in depth direction of the concave cavity may be identical or different.

In order to cause the temperature to rise as much as possible in the deepest located tube, it may be advantageous to surround said tube separately with another— e.g. round—tube of solar radiation-transmissive material. If desired, vacuum may be drawn in said special tube, thus counter-acting undesirable convection due to the varying high temperature levels in the collector space.

It is likewise possible to vacuumize the entire internal collector space defined by the concave, reflective surface, the cover in front of the entrance and the end walls.

The solar heat collector according to the invention may be incorporated in any required number on surfaces suitable for heat collection and be combined to solar heat collection installations.

The invention will now be explained, by way of example, with reference to the accompanying diagrammatic drawings, wherein:

FIG. 1 is a cross section of a solar heat collector, according to the invention;

FIG. 2 is a cross section, on substantially smaller scale, of a series of four collectors according to FIG. 1 combined to a battery;

FIG. 3 is a side view of a collector according to FIG. 1 of vertical longitudinal section through said collector on a slightly smaller scale than FIG. 1;

FIG. 4 is a front view pertaining to FIG. 3 on the line IV—IV in FIG. 3; and

FIGS. 5A–C show, for different angles of incidence in the collector, the path of the rays and their reverberation on the median plane.

In accordance with the drawings, reference numeral 1 generally indicates a solar heat collector having a concave, reflective surface which comprises a cross-sectionally semi-circular portion 2 having radius R and two cross-sectionally short, straight extensions 3 formed thereon, at the two longitudinal edges of the portion 2.

The reflective surface 2,3,3 is formed by a curved, polished aluminum sheet or aluminum foil which is attached via an insulation layer 4' to a support face 4 forming the bottom of an encasing of the collector.

Over the encasing opening, which is defined by the end or longitudinal edges of the bottom and of the two end walls 5 of the encasing, has been applied a cover plate 7 made of solar radiation-transmissive material, in the present case transparent plastics material, as cover. Said cover thus also constitutes the sealing for the internal collector space defined by the reflective surface 2,3,3 and the two end faces 6, which are shown in FIGS. 3 and 4, and which end faces may likewise consist of polished aluminum sheet or foil material.

By reference numeral 8 is shown in FIGS. 1-4 a first and by 9 a second cross-sectionally planar tube. Said tubes contain liquid to be heated through the solar rays collected by the collector. Both tubes are mounted in the collector, with the longest dimension of their cross section in depth direction of the collector according to an imaginary median plane M, halving the collector lengthwise.

The section of the tube 8 extends—in the embodiment shown—in depth direction of the collector from close to the line of intersection of the median plane M with the circular portion 2 of the reflective surface to approximately 40% of the radius R and of the tube 9 over the remaining 60% of said radius R. Thus, consequently, substantially the entire range of the median plane M, insofar extending in the collector space, is covered by the two tubes 8 and 9. For practical reasons, however, the two tubes 8 and 9 may also each cover about half the radius R.

In the present embodiment shown in FIGS. 1-4, the tube 8 is surrounded by a, in the present case cross-sectionally, round tube 10 of similar material as the cover plate 7. The tube 10 has a diameter slightly larger than the longest dimension of the cross section of tube 8.

The tubes 8 and 9, as shown in FIGS. 3 and 4, are connected at their one end beyond the end face 6 but within the end wall 5, via transverse branches 8' and 9', to a liquid pipe system, not shown. Through said system circulates the liquid which is heated in the collector and which has to emit elsewhere the heat collected in the collector through exchanging means. No further details will be given thereon, since it concerns known per se embodiments of installations for utilizing solar heat collected in a liquid system.

FIG. 3 shows the inclined arrangement of the collector 1, in the present case with the longitudinal axis in a vertical, North-South oriented plane approximately at an angle of 55° to the horizontal plane. In this Figure, reference numeral 11 indicates a connection between the tubes 8 and 9, since it concerns a system wherein the tubes 9 and 8 are successively traversed. By pre-heating the liquid to be heated in the tube 9, it is thus possible to obtain a higher temperature level in tube 8. Furthermore, reference is made in this connection to the following explanation to FIGS. 5A–C.

The tube 10 has been omitted in FIG. 3 for clarity's sake.

FIG. 2 shows four collectors 1a–d combined to one battery. The cover plates 7a–c may be united here to one common cover plate. The various median planes here have the reference numerals Ma–Md.

This Figure also shows the orientation with the openings of the collector spaces oriented to the South. On the southern hemisphere this will naturally be to the North.

As indicated in FIG. 1 for an incident ray S the reverberation is in to the direction S'. FIGS. 5A–5C indicate for different points of time of the day with associated sun's altitudes, upon stationary arrangement of the collector 1, the pattern of the incident and reverberated rays. The heat collector provisions are diagrammatically indicated in these FIGS. by reference numeral 18.

Adjacent the arrows are indicated respectively the reference letters $S_A$ with reverberated rays $S_A'$ and likewise $S_B$ and $S_B'$, as well as $S_C$ and $S_C'$.

It is clear that all collected rays eventually find their way either directly or otherwise by substantially only single reverberation to the heat collection provisions arranged along to the median plane M. FIGS. 5A–5C show that the collected rays, not directly impinging on the heat collection provisions, contact said heat collection provisions largely after only one reverberation, while likewise any reverberation in an outward direction is effectively prevented.

A further consideration of FIGS. 5A–5C furthermore clearly shows that in the deepest part, the largest concentration and hence the most intensive heating will occur. For this reason two tubes 8 and 9 are employed in the embodiment shown in FIGS. 1–4 for attaining different heating levels.

FIG. 5A shows by reference numeral 2' by means of a dotted line, how the reflective surface 2 in the deepest central region, behind the rear boundary of the heat collection provisions 18, may be slightly V-shaped and backwardly bulged. By this feature it is achieved that during the hours with the highest sun's altitude, the sun rays impinge slightly earlier and at a more favourable angle on the deepest portion of the heat collection provisions, so that the thermal efficiency of the collector becomes more favourable still.

I claim:

1. A solar heat collector comprising
   a stationary elongated concave reflective surface having a semi-circular cross section bisected by a longitudinal median plane,
   said reflective surface being permanently positioned with said median plane being in a vertical plane with a north-south orientation,
   a cover plate of solar radiation transmissive material extending over said reflective surface,
   two collector tubes extending side by side in said median plane between said reflective surface and said cover plate,
   said collector tubes being thermally separated from each other and having cross-sectional shapes with elongated dimensions in said median plane;
   said collector tubes occupying substantially all of said median plane between said reflective surface and a center axis defined by said reflective surface whereby said tubes receive substantially all of the sunlight incident upon said collector regardless of the time of day,
   said elongated median plane dimension of the tube closer to said reflective surface being substantially less than said elongated median plane dimension of the tube closer to said cover plate, and
   a solar radiation transmissive tube surrounding the collector tube closer to said reflective surface.

2. A solar heat collector according to claim 1 wherein the solar radiation transmissive tube surrounding the collector tube closer to the reflective surface is glass or plastic and has a circular cross section with a diameter slightly larger than the longitudinal dimension of the cross section of the tube closer to the reflective surface.

3. A solar heat collector according to claim 2 wherein the two collector tubes are connected in series with the collector tube closer to the reflective surface being downstream from the collector tube closer to the cover plate.

4. A solar collector according to claim 1 wherein
   the tube closer to said reflective surface has a width in the median plane approximately equal to 40% of the radius of the reflective surface, and
   the tube closer to said cover plate has a width in the median plane approximately equal to 60% of the radius of the reflective surface.

5. A solar heat collector according to claim 4 including equal parallel planar reflective surface extensions formed on the two longitudinal edges of the reflective surface with semi-circular cross sections.

* * * * *